United States Patent
Schmehl et al.

(10) Patent No.: US 12,016,364 B2
(45) Date of Patent: Jun. 25, 2024

(54) COFFEE ROASTING SYSTEM WITH ROASTING AND COOLING SUBSYSTEMS, AND METHODS FOR THE SAME

(71) Applicant: Bellwether Coffee Co., Berkeley, CA (US)

(72) Inventors: Stewart Schmehl, Pinehurst, NC (US); John Sandhu, Boulder, CO (US); Ronald Kappesser, Concord, CA (US); Peter Schmehl, Berkeley, CA (US)

(73) Assignee: Bellwether Coffee Co., Berkeley, CA (US)

( * ) Notice: Subject to any disclaimer, the term of this patent is extended or adjusted under 35 U.S.C. 154(b) by 0 days.

(21) Appl. No.: 17/391,579

(22) Filed: Aug. 2, 2021

(65) Prior Publication Data
US 2023/0030677 A1 Feb. 2, 2023

(51) Int. Cl.
*A23N 12/12* (2006.01)
*A23F 5/04* (2006.01)

(52) U.S. Cl.
CPC .............. *A23N 12/125* (2013.01); *A23F 5/04* (2013.01)

(58) Field of Classification Search
CPC ....... A23F 5/04; A23N 12/125; A23N 12/083; A23N 12/10; A23N 12/12; B01F 2035/99; B01F 2101/09; B01F 27/1921; B01F 35/91; F24C 15/04; F24C 15/322
USPC ......................................................... 99/286
See application file for complete search history.

(56) References Cited

U.S. PATENT DOCUMENTS

| | | | |
|---|---|---|---|
| 1,970,499 A * | 8/1934 | Dent ................... | A23N 12/083 241/34 |
| 2,089,663 A | 8/1937 | Richeson | |
| 3,595,668 A * | 7/1971 | Nutting et al. ......... | A23F 5/046 426/468 |
| 4,642,906 A | 2/1987 | Kaatze et al. | |
| 4,875,904 A | 10/1989 | Munk | |
| 7,285,300 B1 | 10/2007 | Allington et al. | |

(Continued)

FOREIGN PATENT DOCUMENTS

CN 108031376 A * 5/2018 .............. B01F 11/00

OTHER PUBLICATIONS

International Search Report and Written Opinion for Application No. PCT/US2022/039144, dated Nov. 28, 2022, 34 pages.

*Primary Examiner* — Nathaniel E Wiehe
*Assistant Examiner* — Ket D Dang
(74) *Attorney, Agent, or Firm* — COOLEY LLP (57) ABSTRACT

A bean roasting system includes a roasting subsystem, a cooling subsystem, an air exit subsystem that is fluidically coupled to the cooling subsystem, and a controller. The cooling subsystem includes an outer housing containing a holding chamber, a cooling platform defining a lower bound of the holding chamber, a vibration actuator coupled to the cooling platform, and a platform actuator coupled to the cooling platform. The controller is configured to operate the air exit subsystem to maintain a flow of air up through the holding chamber, operate the roasting subsystem to transfer a batch of beans from the roasting subsystem to the holding chamber, operate the vibration actuator to vibrate the cooling platform, operate the air exit subsystem and operate the vibration actuator accelerates cooling of the batch of beans, and operate the platform actuator to transport the batch of beans out of the cooling subsystem.

20 Claims, 9 Drawing Sheets

(56) References Cited

U.S. PATENT DOCUMENTS

| | | |
|---|---|---|
| 2006/0283337 A1 | 12/2006 | Kato |
| 2013/0344207 A1 | 12/2013 | Ludwig |
| 2018/0295870 A1 | 10/2018 | Lopez et al. |
| 2019/0208798 A1 | 7/2019 | Voges et al. |
| 2019/0320702 A1 | 10/2019 | Sandhu et al. |
| 2019/0320703 A1 | 10/2019 | Sandhu et al. |
| 2019/0350247 A1 | 11/2019 | Lopez et al. |
| 2019/0373940 A1 | 12/2019 | Voges et al. |
| 2020/0288765 A1 | 9/2020 | Lopez et al. |
| 2021/0227871 A1 | 7/2021 | Sandhu et al. |
| 2021/0386108 A1 | 12/2021 | Lopez et al. |

* cited by examiner

COFFEE ROASTING SYSTEM WITH ROASTING AND COOLING SUBSYSTEMS, AND METHODS FOR THE SAME

FIELD OF THE DISCLOSURE

The present disclosure pertains to the roasting of food products, for example beans such as coffee beans. In one or more embodiments, the present disclosure describes a roasting system having an improved system for roasting and cooling the beans.

BACKGROUND

Food roasting machines are in wide use. One particularly common roasting machine is utilized to prepare coffee beans to be either packaged or ground and brewed. A typical roasting machine includes a roasting chamber for supporting, agitating, and roasting beans. It is desirable to provide an automated way of roasting, cooling, and unloading beans that minimizes an overall cycle time.

BRIEF DESCRIPTION OF THE FIGURES

FIG. 1 is a schematic diagram of an embodiment of a roasting system for processing a batch of coffee beans. FIG. 1 illustrates connections between elements that are either fluidic connections or concern a physical transfer of a batch of beans.

FIG. 2 is a simplified electrical block diagram for the roasting system of FIG. 1. FIG. 2 illustrates electrical or wireless connections between elements including a controller.

SUMMARY

In a first aspect of the disclosure, a bean roasting system includes a roasting subsystem configured to receive and to thermally roast beans, a cooling subsystem, an air exit subsystem that is fluidically coupled to the cooling subsystem, and a controller. The cooling subsystem includes an outer housing containing a holding chamber, a cooling platform defining a lower bound of the holding chamber, a vibration actuator coupled to the cooling platform, and a platform actuator coupled to the cooling platform. The controller is configured to operate the air exit subsystem to maintain a flow of air up through the holding chamber, operate the roasting subsystem to transfer a batch of beans from the roasting subsystem to the holding chamber, operate the vibration actuator to vibrate the cooling platform, operate the air exit subsystem and operate the vibration actuator accelerates cooling of the batch of beans, and operate the platform actuator to transport the batch of beans in a downward direction and out of the cooling subsystem.

In one implementation the cooling subsystem includes an upper subunit, a middle subunit, and a lower subunit. The middle subunit includes the cooling platform. The upper subunit defines a chute for receiving the batch of beans from the roasting subsystem. The upper subunit can further define an air conduit that is coupled to the air exit subsystem and receives the flow of air from the holding chamber. The air exit can include an exit fan that is coupled to the air conduit and is configured to maintain the flow of air.

In another implementation the cooling platform can include a plurality of resilient supports that couple the cooling platform to the outer housing. The vibration actuator is coupled between the outer housing and the cooling platform and imparts relative vibratory motion between the cooling platform and the outer housing which flexes the resilient supports. The relative vibratory motion is primarily lateral motion that is generally parallel to an upper surface of the cooling platform.

In yet another implementation, the cooling platform includes a plurality of rotatable leaves. The platform actuator is configured to rotate the plurality of rotatable leaves to transport the batch of beans out of the bean cooler. The cooling platform can include a generally rectangular frame. The plurality of rotatable leaves are individually rotatably mounted to the rectangular frame with an axis of rotation that is generally along the rectangular frame. The rotatable leaves define at least one line along which the leaves meet. During rotation, the leaves rotate downwardly about the axis of rotation and away from the at least one line. The plurality of rotatable leaves can include four leaves and the at least one line can include two crossed lines. The rectangular frame can have a generally square shape.

In a further implementation, the cooling subsystem includes a lower subunit below the cooling platform. The lower subunit generally converges in a downward direction to facilitate dispensing the batch of beans into a container or bag. The platform actuator is coupled between the lower subunit and the cooling platform.

In a yet further implementation, the bean roasting system includes a "ventless" air handling system. "Ventless" implies that the air handling system recirculates heated air through the roasting subsystem and other components including at least one heater and at least one component for removing particles and gaseous effluents from the heated air. The air handling system can include two air flow branches (or loops) that are coupled by a bypass. The air handling system can include more than one heater including a main heater and an auxiliary heater. The other components can include a cyclone for removing the particulates and a catalytic converter for removing the gaseous effluents. All components of the bean roasting system can be electric.

In a second aspect of the disclosure, a method of manufacturing roasted beans includes providing and operating components of a bean roasting system. The bean roasting system includes a roasting subsystem configured to receive and to thermally roast beans, a cooling subsystem, and an air exit subsystem that is fluidically coupled to the cooling subsystem. The cooling subsystem includes an outer housing containing a holding chamber, a cooling platform defining a lower bound of the holding chamber, a vibration actuator coupled to the cooling platform, and a platform actuator coupled to the cooling platform. The method includes operating the air exit subsystem to maintain a flow of air up through the holding chamber, operating the roasting subsystem to transfer a batch of beans from the roasting subsystem to the holding chamber, operating the vibration actuator to vibrate the cooling platform, operating the air exit subsystem and operating the vibration actuator accelerates cooling of the batch of beans, and operating the platform actuator to transport the batch of beans in a downward direction and out of the cooling subsystem.

DETAILED DESCRIPTION

Figure 1:
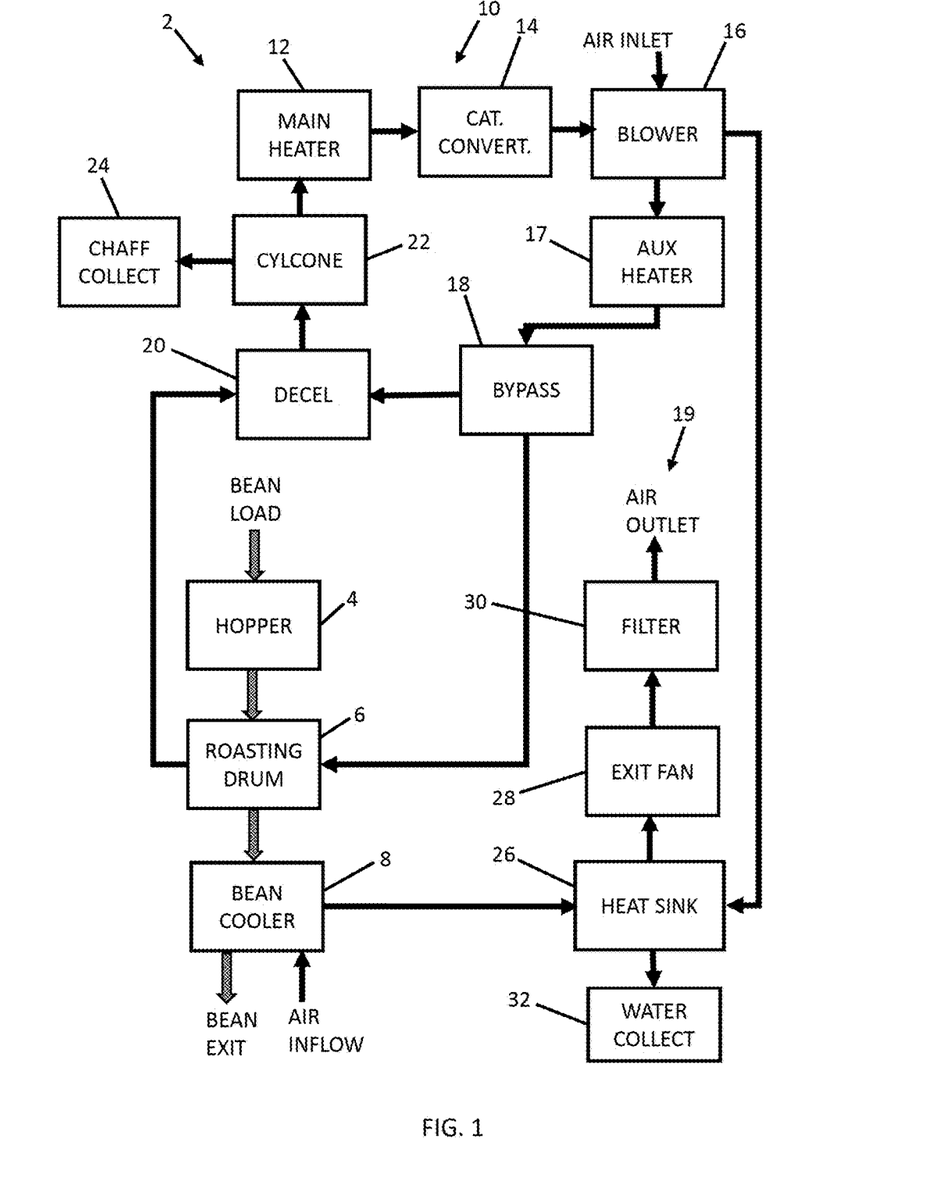

FIG. 1 is a schematic diagram of an embodiment of a roasting system 2. FIG. 1 discloses fluid paths between various functional elements. The fluid paths tend to conduct gaseous fluids such as air, water vapor, and gaseous emissions from beans being roasted or cooled. In addition, particulates from the roasting process can also be transmitted or entrained through the fluid paths. FIG. 1 also discloses a path for a batch of beans from a bean load to a bean exit.

Roasting system 2 includes a hopper 4 for loading and receiving a quantity or batch of unroasted beans. The hopper 4 feeds the unroasted beans into a roasting drum 6 or roasting subsystem 6 within which the batch of beans is heated and roasted, for example, according to a pre-programmed roasting process. Adjacent or below the roasting drum 6 is a bean cooling subsystem 8 or bean cooler 8 for receiving the batch of beans when they are in a just-roasted state (still hot), holding the batch of beans until they are cooled, and then dispensing the batch of beans into a receiving container such as a bag (not shown).

The roasting drum 6 is coupled to an air handling system 10 that includes a main heater 12, a catalytic converter 14, a blower 16, an auxiliary heater 17, a bypass 18, a velocity decelerator 20, a cyclone separator 22, and chaff collector 24. The air handling system 10 determines a temperature versus time roasting profile through controlled operation of the main heater 12, blower 16, auxiliary heater 17, bypass 18, and possibly other components of the air handling system 10. An air stream (indicated by arrows) recirculates through the air handling system 10. The air handling system 10 receives and removes particles and gaseous effluents emitted during the roasting process. The particles are captured by the cyclone 22, which deposits them in the chaff collector 24, which is periodically emptied. The gaseous effluents are collected by the catalytic converter 14.

The air handling system 10 defines two different branches or loops of air flow that are coupled by the bypass 18. One branch circulates from the bypass 18 to a decelerator 20, through the cyclone 22, main heater 12, catalytic converter 14, blower 16, and auxiliary heater 17, before returning to the bypass 18. Another branch passes from the bypass 18 to the roasting drum 6, to the decelerator 20, the cyclone 22, main heater 12, catalytic converter 14, blower 16, and auxiliary heater 17, before returning to bypass 18.

Part of an airstream generated by the blower 16 passes through an air exit subsystem 19 including a heat sink 26, an exit fan 28, and a filter 30 before being passed to environmental air (labeled as "air outlet" in FIG. 1). The heat sink 26 has the effect of condensing water vapor from the exit airstream as well as cooling the exit airstream. The condensed water vapor drips into a water collection receptacle 32. Replacement air (labeled "air inlet" in FIG. 1) from the environment air enters the blower 16. The overall effect is to remove water vapor from the air handling system 10 and to condense the water into the water collection receptacle 26.

The bean cooler 8 is also coupled to the air exit subsystem 19. The exit fan 28 therefore draws air out of the bean cooler 8 through the heat sink 26. This has the effect of accelerating cooling of the batch of beans.

Figure 2:
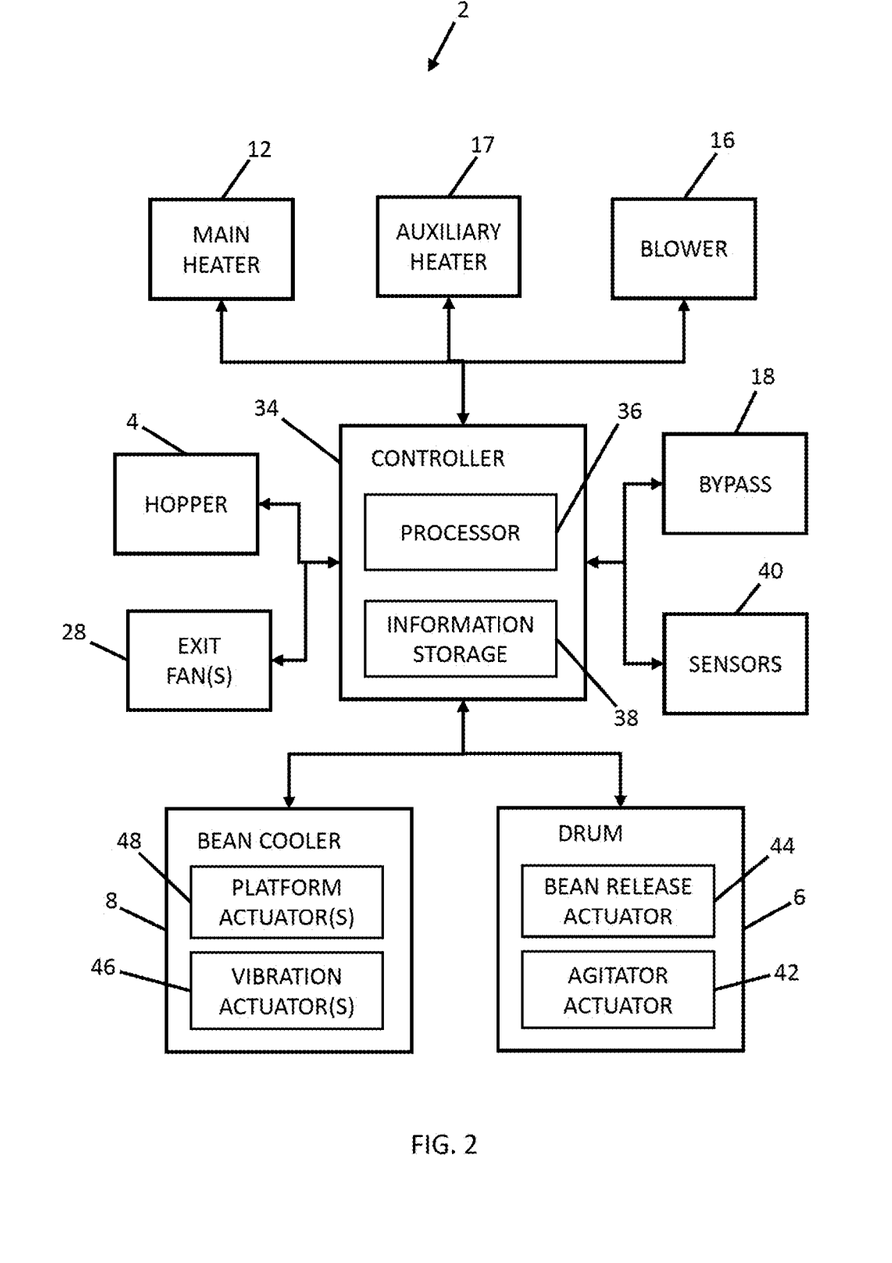

FIG. 2 is a simplified electrical block diagram of the roasting system 2. Relative to FIG. 1, like element numbers refer to like components. However, whereas FIG. 1 focuses on fluidics and the physical motion of beans, FIG. 2 focuses on electrical or wireless connections between components.

A controller 34 includes a processor 36 coupled to an information storage device 38. The information storage device 38 is a non-volatile or non-transient information storage device 38 that stores software instructions. When executed by the processor 36, the software instructions can control portions of the roasting system 2 that the controller 34 is configured to control. For example, the controller 34 can control any of the hopper 4, drum 6, bean cooler 8, main heater 12, blower 16, auxiliary heater 17, bypass 18, exit fan(s) 28, and other portions of the roasting system 2. The controller 34 can receive information form one or more sensors 40 for monitoring a status of portions of roasting system 2. The controller 34 is configured to control various actuators including an agitator actuator 42, a bean release actuator 44, a vibration actuator 46, and a platform actuator 48.

The agitator actuator 42 is configured to agitate the batch of beans within the drum 6 during the roasting process. The bean release actuator 44 is configured to release the batch of beans after roasting so that they can enter the bean cooler 8. The vibration actuator 46 is configured to vibrate the batch of beans and to enhance uniformity and rate of cooling of the batch of beans. The platform actuator 48 is configured to release the batch of beans after cooling to be dispensed into a container or bag.

In an embodiment, the agitator actuator 42 is configured to rotate an agitator. The agitator can include an agitator blade set supported by a central shaft. The agitator actuator can include a motor and a power coupling that couples the motor to the central shaft. The power coupling can include a gearbox and/or a belt that provides rotative coupling between the motor and the central shaft. In an embodiment, the bean release actuator 44 includes a pneumatic cylinder configured to open and close a hatch formed into a lower surface of the drum 6.

In an embodiment, the vibration actuator 46 can include a motor coupled to an elliptical cam or gear that couples to and shakes a cooling platform, which in turn supports a batch of beans while cooling. In other embodiments the vibration actuator 46 can take other forms such as a motor with an elliptical weight or a piezoelectric transducer stack. In an embodiment, the platform actuator 48 can include one or more pneumatic cylinders configured to open and close an opening in the cooling platform.

Figure 3:
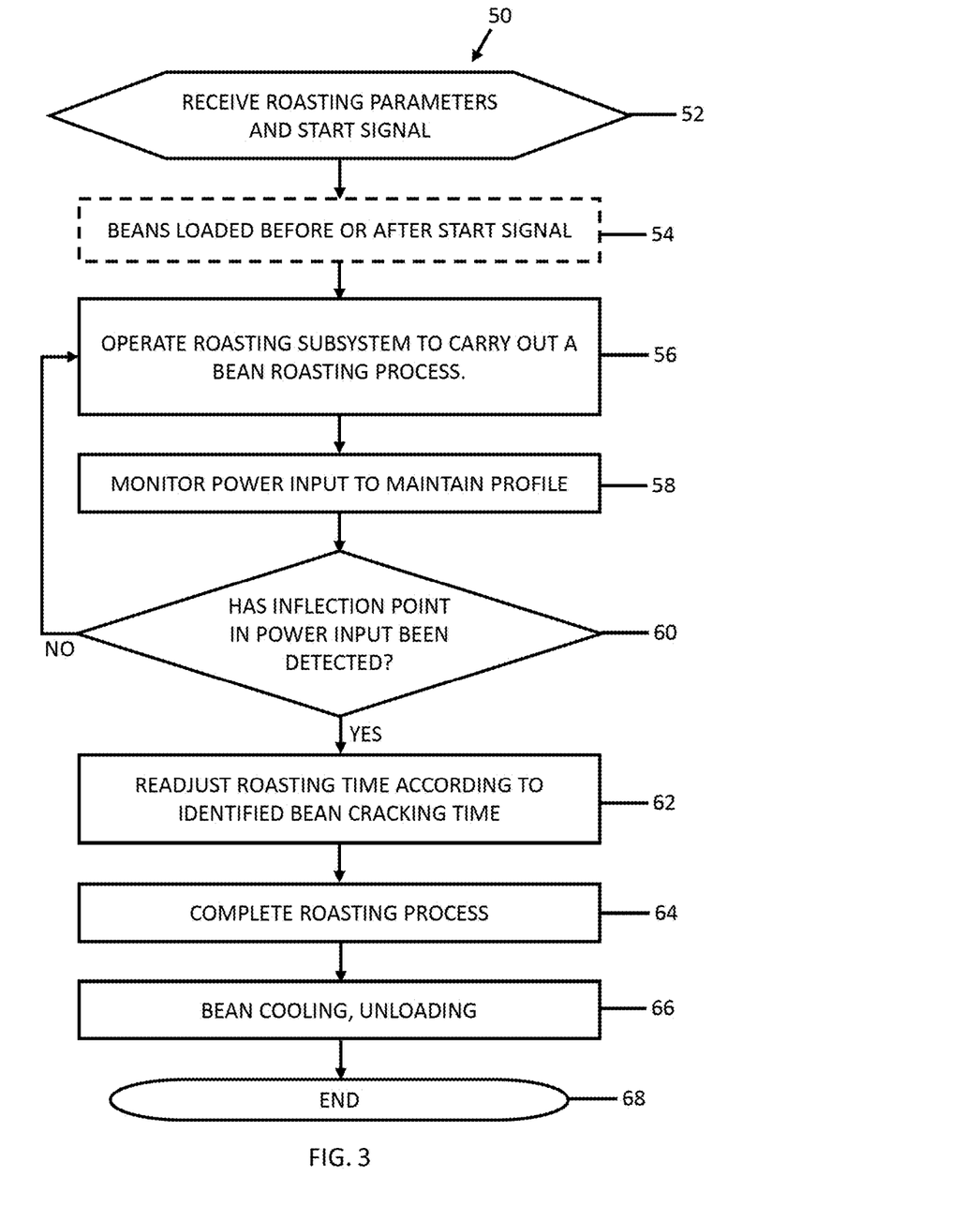
FIG. 3 is a flowchart of an embodiment of a roasting process for a batch of beans.

FIG. 3 is a flowchart of an embodiment of a roasting process 50 that is controlled by the controller 34. According to 52, controller 34 receives roasting parameters and a start signal. The roasting parameters can be indicative of a temperature-versus-time profile for roasting. The roasting parameters may also include a temperature profile before and after a bean cracking event is detected.

According to 54, a batch of beans is automatically or manually loaded into the hopper 4. Step 54 is showed in a dashed outline to highlight that it can be performed before or after step 52.

According to step 56, the roasting system 10 is operated to agitate and heat the batch of beans to begin and executing a bean roasting process. Executing the roasting process includes more particular processes including (1) operating the hopper to release the batch of beans into the drum, (2) operating the agitator actuator 42 to begin stirring and agitating the batch of beans, and (3) operating the air handling system 10 to heat the drum and to remove byproducts of the roasting process. The temperature in the drum ramps up and then stabilizes at a roasting temperature.

According to 58, a power used by the air handling system 10 to maintain the roasting temperature (by heating the drum) is monitored. The power is used to compensate for heat losses from the air handling system as well as a phase change that occurs as water is released from the batch of beans. The power usage will tend to be fairly stable and to drop during roasting initially. However, when the beans begin cracking, an exposure of water from within the beans will result in the air handling system 10 using more power to compensate for a phase change in the water from liquid to gaseous phase. The controller will then detect an increase in the power input in step 58. This increase in power is referred to as an "inflection point" in the monitored power level.

According to 60, detection of the inflection point in power level causes the process to proceed to step 62. Otherwise, the process loops back to steps 56 and 58 to continue to maintain the roasting temperature and monitor the input power.

Once the inflection point is determined, the controller 34 computes or determines a remaining temperature profile (temperature versus time) to complete the roasting process according to step 62. According to step 64, the controller applies the determined remaining temperature profile to the batch of beans.

According to 66, the controller controls the drum 6 and bean cooler 8 to cool and release the batch of beans. This ends at step 68 with the beans released into a container such as a bag.

Figure 4:
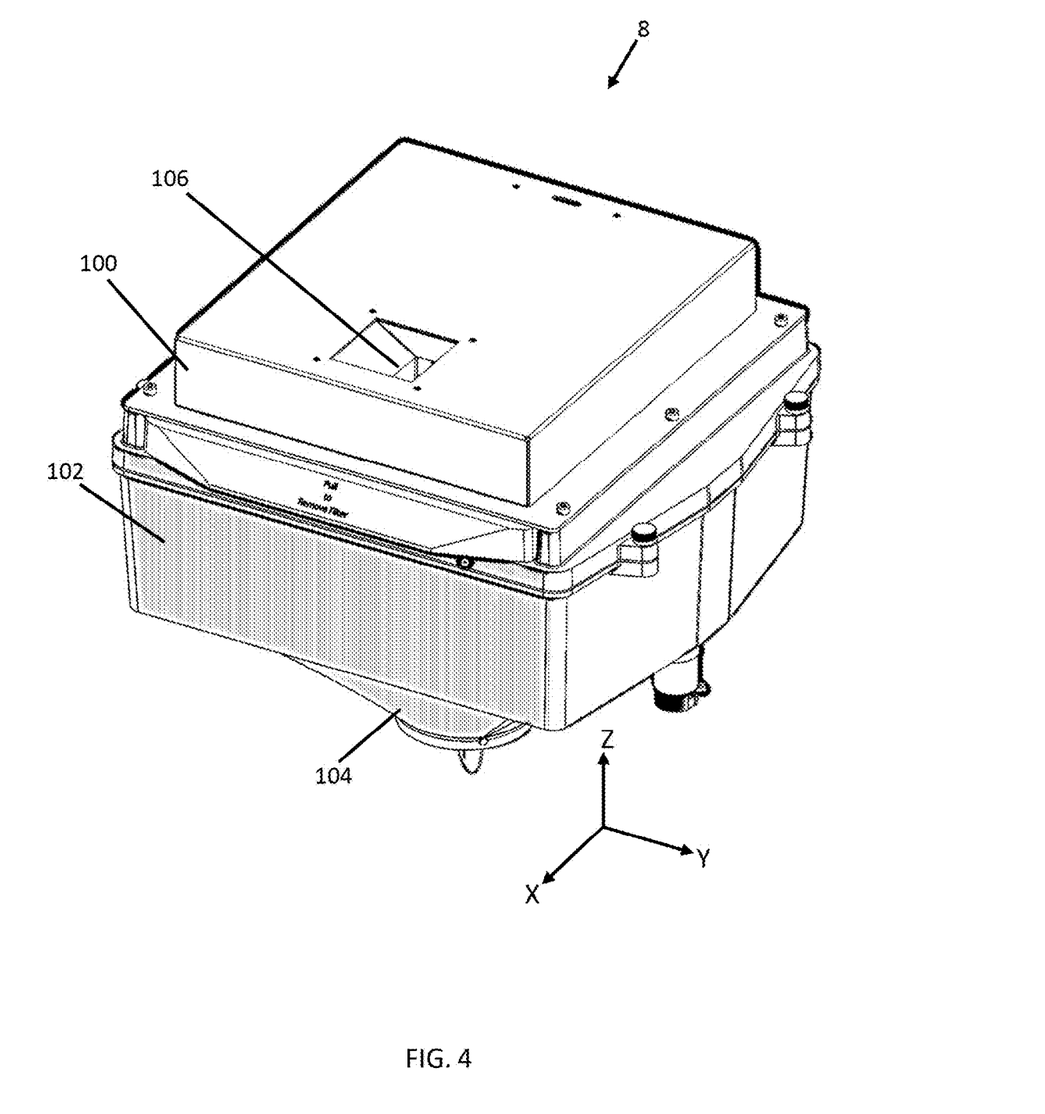
FIG. 4 is an isometric view of an embodiment of a portion of a bean cooling subsystem otherwise referred to as a "bean cooler".

FIG. 4 is an isometric view of an embodiment of a portion of the bean cooling subsystem or bean cooler 8. Bean cooler 8 includes an upper subunit 100, a middle subunit 102, and a lower subunit 104. The upper subunit 100 defines a chute 106 for receiving the batch of beans from the roasting subsystem 6. The middle subunit 102 is for containing the batch of beans while cooling. The lower subunit 104 has a generally tapered shape in a downward (−Z) direction to facilitate dispensing the batch of beans from the bean cooler 8 into a bag or container (not shown).

Figure 5:
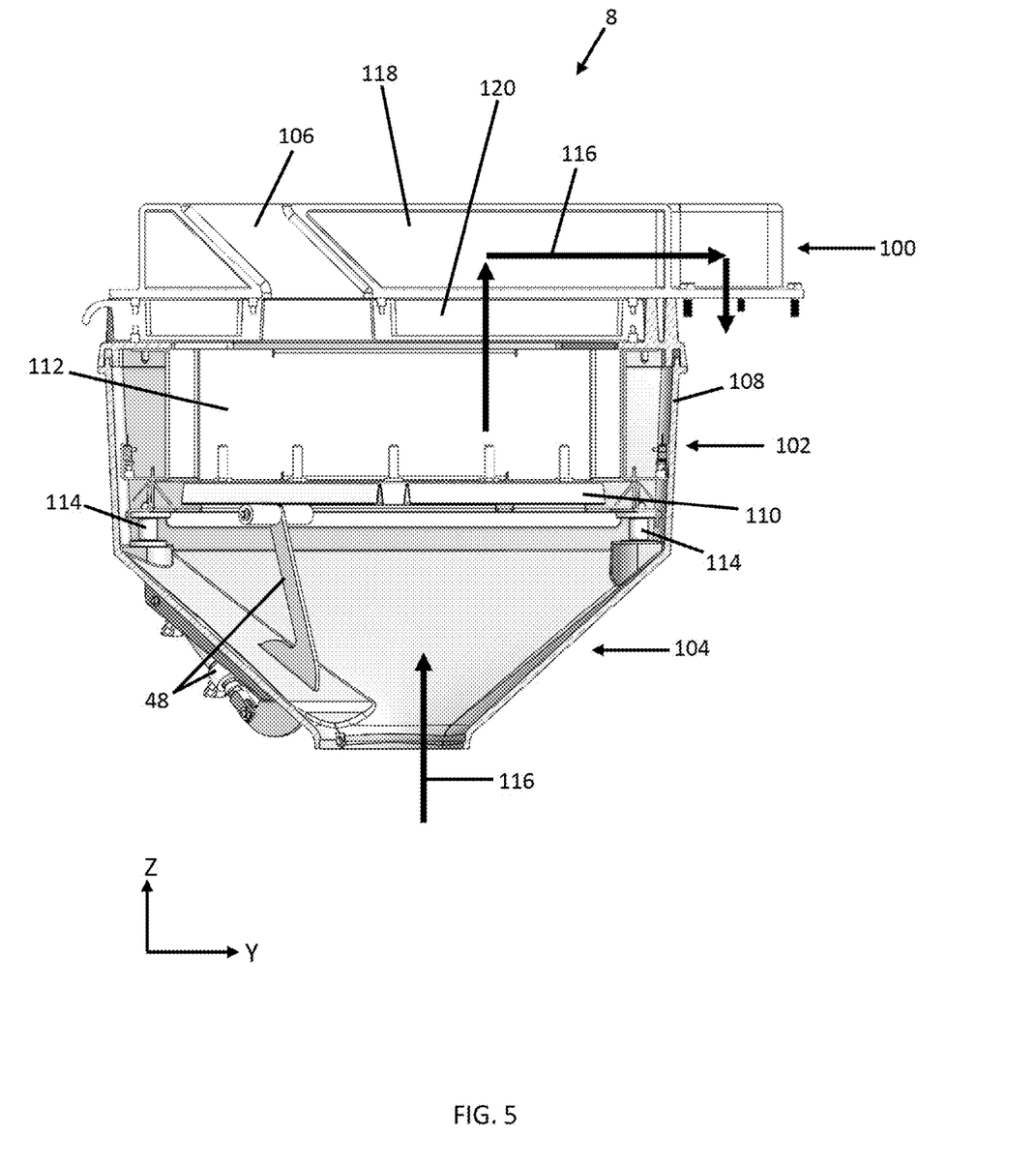
FIG. 5 is a vertical cross-section view of an embodiment of a bean cooler.

FIG. 5 is a vertical cross-section view of the embodiment of the bean cooler 8 shown in FIG. 4. Bean cooler 8 includes an outer housing 108 that forms part of the middle 102 and lower 104 subunits. Within the outer housing 108 (e.g., disposed within an interior of the outing housing 108) is a cooling platform 110. The outer housing 108 also contains (or defines or disposes) a holding chamber 112 that is vertically bounded by the upper subunit 100 and the cooling platform 110.

A plurality of resilient supports 114 couple the cooling platform 110 to the outer housing 108. The resilient supports 114 are formed from a flexible material such as rubber so that the cooling platform 110 can move or vibrate relative to the outer housing 108. Not shown in FIG. 5 is the vibration actuator 46, which is coupled between the outer housing 108 and the cooling platform 110. The vibration actuator 46 is configured to impart primarily lateral vibratory motion (along the lateral X and Y axes) of the cooling platform 110 relative to the outer housing 108.

The platform actuator 48 is coupled between the lower subunit 104 portion of the outer housing 108 and the cooling platform 110. The platform actuator 108 is configured to move the platform actuator 110 to allow a cooled batch of beans to fall through the lower subunit 104 and into a container such as a bag. More details of the action of the platform actuator 48 will be discussed with respect to FIGS. 7A and 7B.

The bean cooler 8 defines (or forms) an air flow path 116 that extends (1) up through the lower subunit 104, (2) up through the cooling platform 110, (3) up through the holding chamber 112, (4) into and through a conduit 118 within the upper subunit 100 (and through a filter chamber 120), and (5) and out to the heat sink 26 (shown in FIG. 1). The exit fan 28 (shown in FIGS. 1 and 2), the air flow path 116 and other components (heat sink 26, filter 30) form an air exit subsystem 19 for transporting environmental air through the holding chamber 112.

The vibration actuator 46 and air exit subsystem 19 work synergistically to uniformly and rapidly cool the batch of beans. The vibration induced by the vibration actuator 46 combined with the airflow to separate and randomly translate and rotate the batch of beans. The batch of beans therefore individually receive cooling airflow on all sides, providing the rapid and more uniform cooling.

Figure 6A:
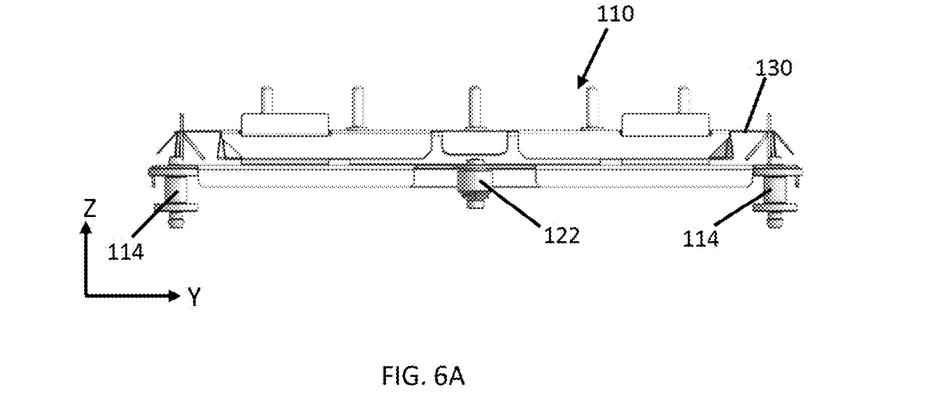
FIG. 6A is a side view of an embodiment of a cooling platform in isolation.

FIG. 6A is a side view of the cooling platform 110 shown in FIG. 5 without showing several other components of the bean cooler 8 of FIG. 5. As stated earlier, the cooling platform 110 is coupled to the outer housing 108 via four resilient supports 114. Also shown is a coupler 122 that couples the cooling platform 110 to the vibration actuator 46 (not shown in FIGS. 6A and 6B). The vibration actuator 46 can include a motor with an elliptical cam or gear that connects to and shakes the coupler 122. Vibration actuator 46 can take other forms such as a motor with an elliptical weight.

Figure 6B:
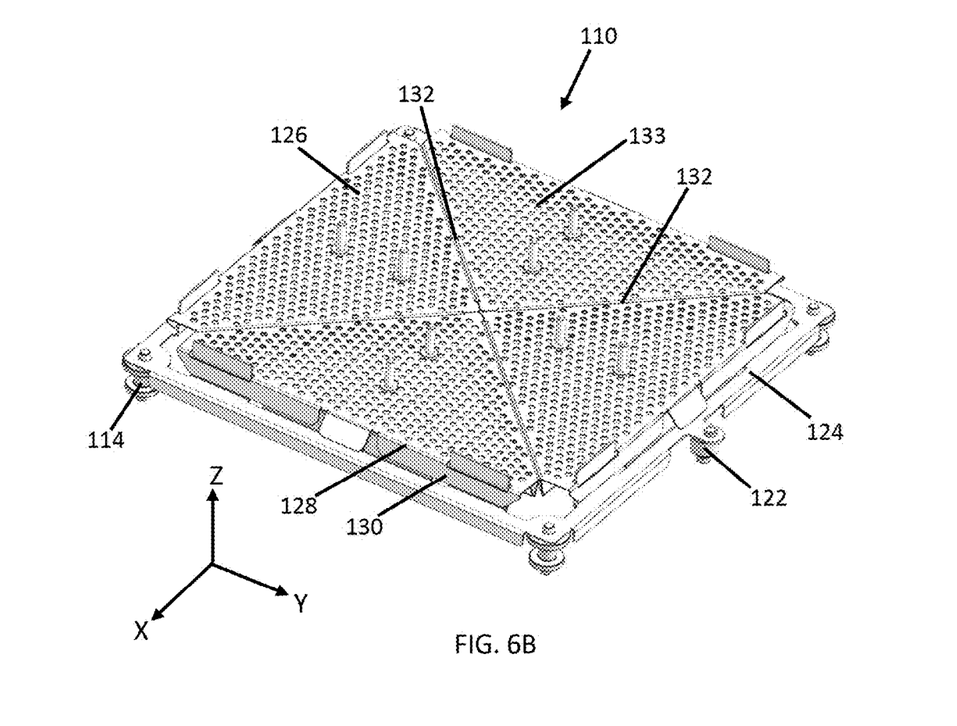
FIG. 6B is an isometric view looking down upon an embodiment of a cooling platform in isolation.

FIG. 6B is an isometric top view of the cooling platform 110 shown in FIG. 5 without showing several other components of the bean cooler 8 of FIG. 5. The cooling platform 110 includes a rectangular or square frame 124 that is coupled directly to the resilient support 114. Cooling platform 110 also includes four rotatable leaves 126 (also referred to herein collectively as a "floor"). The rotatable leaves 126 individually include a proximal side 128 coupled to the frame 124 by a flexure or hinge 130. The rotatable leaves 126 meet along two crossed lines 132. The rotatable leaves 126 define an area array of perforations 133 to allow air flow path 116 to uniformly pass through the batch of beans being cooled.

Figure 7A:
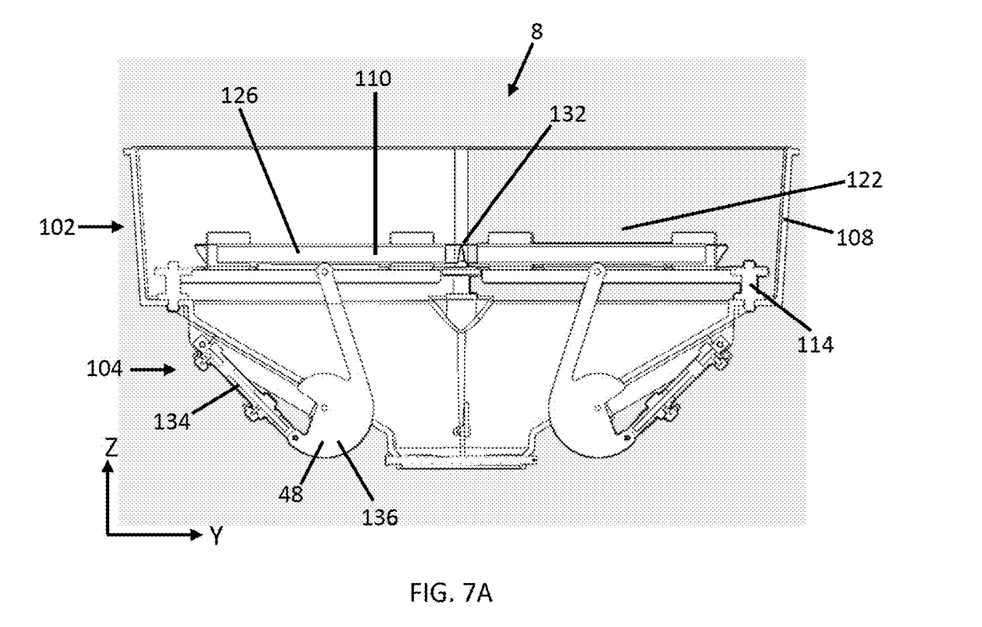
FIG. 7A is a vertical section view illustrating a portion of an embodiment of a bean cooler with a platform in a closed configuration to support a batch of beans during cooling.
Figure 7B:
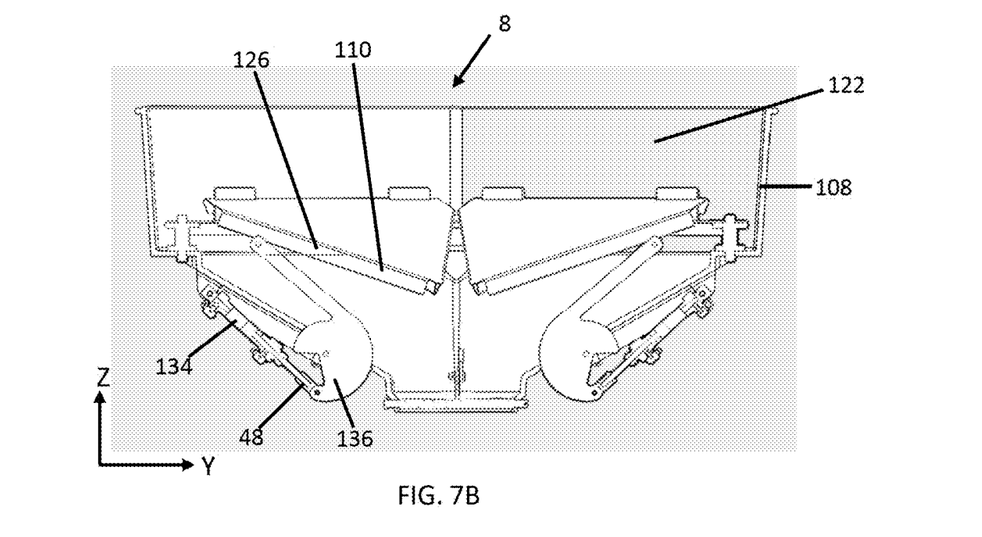
FIG. 7B is a vertical section view illustrating a portion of an embodiment of a bean cooler with a platform in an open configuration to allow a cooled batch of beans to exit the bean cooler.

FIGS. 7A and 7B are vertical section views that illustrate the middle 102 and lower subunits 104 of the bean cooler 8 in two configurations of the cooling platform 110. FIG. 7A illustrates the cooling platform 110 in an upper or holding configuration as previously illustrated in FIGS. 5, 6A, and 6B. This is a configuration for holding a hot batch of beans that are in a process of cooling.

The platform actuator 48 includes a pneumatic actuator 134 that is rotatively coupled to a follower 136. The pneumatic actuator 134 is controlled by controller 34 (shown in FIG. 2) and is rotatably coupled to outer housing 108. The follower 136 is rotatively coupled to a rotatable leaf 126 and to the outer housing 108. In the illustrative embodiment, there are four pneumatic actuators 134 each of which is operatively coupled (via one follower 136 from a group of four followers 136) to one of the four rotatable leaves 126 and each of which is configured to raise and lower one of the rotatable leaves 126.

FIG. 7A illustrates the cooling platform 110 in a closed configuration in which the leaves 126 are substantially horizontal and meet along the crossed lines 132. FIG. 7B illustrates the cooling platform 110 in an open configuration in which the leaves 126 define an oblique angle with respect to the lateral axes X (not shown but having a direction into the page) and Y. As illustrated, the platform actuators 48 are configured to individually rotate the rotatable leaves 126 between the closed (shown in FIG. 7A) and open (shown in FIG. 7B) configurations. Expansion of the pneumatic actuators 134 rotate the leaves 126 from the closed configuration (shown in FIG. 7A) to the open configuration (shown in FIG. 7B). Retraction of the pneumatic actuators 134 rotate the leaves 126 from the open configuration (shown in FIG. 7B) to the closed configuration (shown in FIG. 7A).

Figure 8:
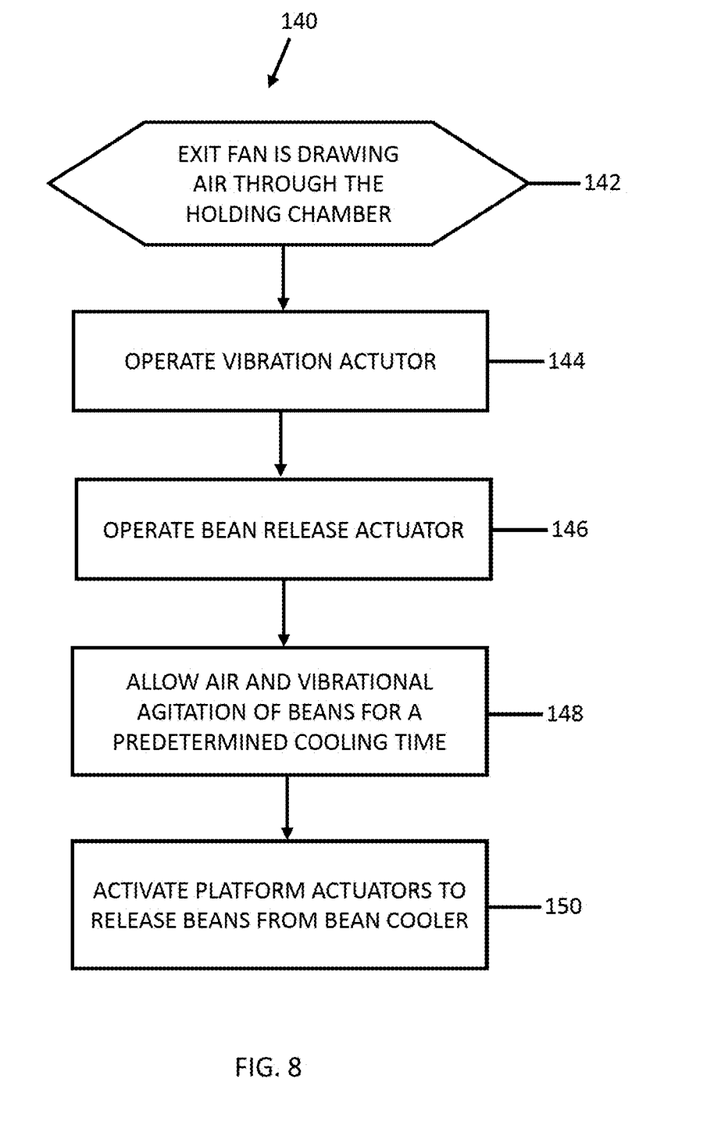
FIG. 8 is a flowchart depicting an embodiment of a method of cooling and releasing or dispensing a batch of beans.

FIG. 8 depicts an embodiment of a method 140 of cooling and dispensing the batch of beans. Method 140 can correspond, for example, to 66 of FIG. 3. According to 142, the exit fan 28 (as part of the air exit subsystem 19) is transporting air along the air flow path 116 including up through the holding chamber 112. At 142, the leaves 126 of cooling platform 110 are in the closed configuration (shown in FIG. 7A).

According to 144, the controller 34 operates and activates the vibration actuator 46. According to 146, the controller 34 operates the bean release actuator 44. In one embodiment, this opens a hatch in the drum 6, which allows a freshly roasted and hot batch of beans to fall from the drum 6, through the chute 106, and into the holding chamber 112 above the cooling platform 110.

According to 148, the beans are allowed to cool while the cooling platform 110 is being vibrated by the vibration actuator 46 and the air is rising through the batch of beans along the air flow path 116. When the beans are cooled (either according to a predetermined cooling time and/or a temperature sensor signal) the controller 34 operates the four platform actuators 48 and thus rotates the leaves 126 to the open configuration (shown in FIG. 7A). The batch of beans can then slide and fall out of the holding chamber 112, through the lower subunit 104, and into a container such as a bag.

The ordering of steps of method 140 can vary. For example, step 146 (dropping beans into bean cooler 8) can occur before step 144 (starting vibration of vibration actuator 46).

Figure 9:
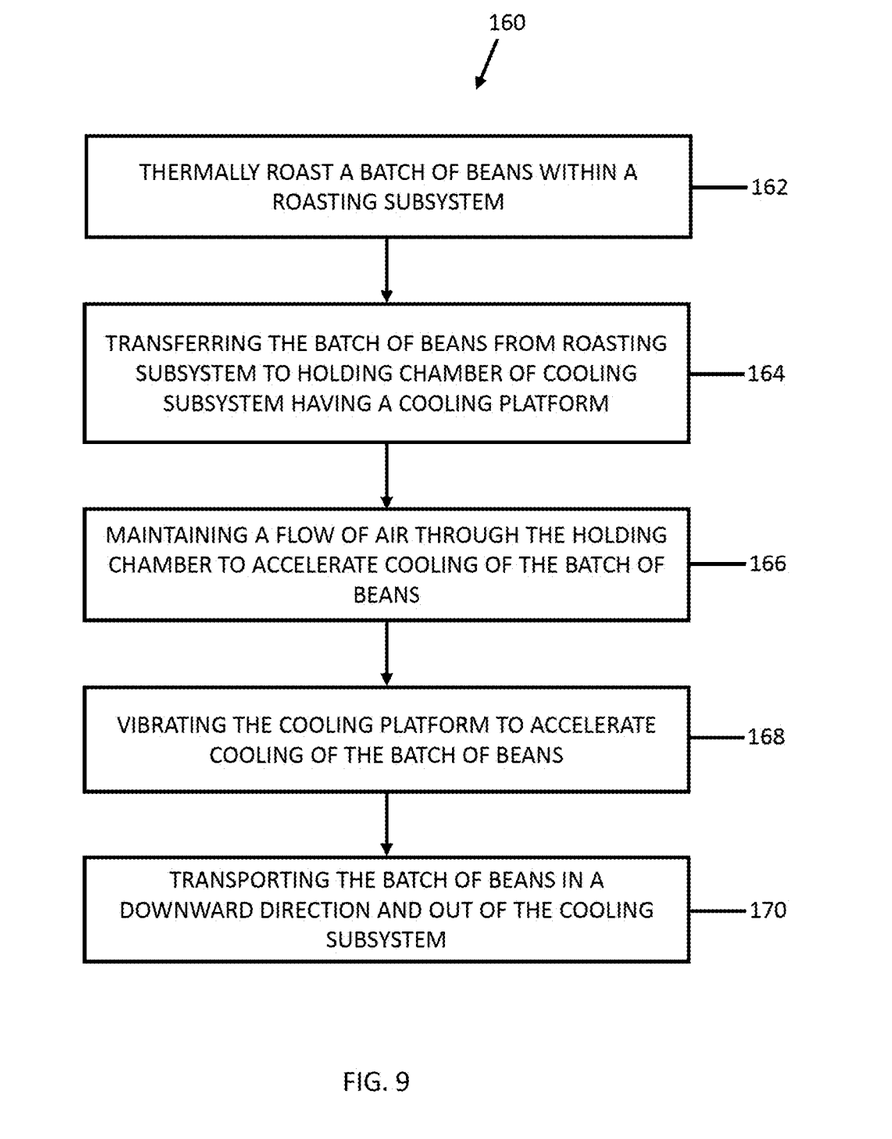
FIG. 9 is a flowchart depicting an embodiment of a method of roasting and cooling a batch of beans.

FIG. 9 is a flowchart depicting an embodiment of a method 160 of roasting and cooling a batch of beans. Method 160 can be performed, for example, by the roasting system 2 under control of controller 34 when the processor 36 executes software instructions stored on the non-transient information storage device 38.

According to 162, a batch of unroasted beans are thermally roasted in a roasting subsystem (e.g., roasting subsystem 6) to provide a hot and roasted batch of beans. According to 164, the batch of hot roasted beans are transferred from the roasting subsystem to a holding chamber (e.g., holding chamber 112) of a cooling subsystem (e.g., cooling subsystem 8). While cooling, the batch of beans is supported by a cooling platform (e.g., cooling platform 110).

According to 166, a flow of air is maintained through the holding chamber to accelerate cooling of the batch of beans. Also according to 168, the cooling platform is vibrated to accelerate the cooling of the batch of beans. The result of a synergistic aspect of 166 and 168 is that the batch of beans is rapidly cooled to provide a cooled batch of beans. According to 170, the cooled batch of beans is transported in a downward direction and out of the cooling subsystem.

The transporting of 170 can include moving or configuring a floor of the cooling platform from a closed configuration (shown in FIG. 7A) to an open configuration (shown in FIG. 7B). The batch of beans transports in the downward direction and out of the cooling subsystem in response to the floor moving from the closed to the open configuration.

The specific embodiments and applications thereof described above are for illustrative purposes only and do not preclude modifications and variations encompassed by the scope of the following claims.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules (e.g., a controller) may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" (or "information storage") should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

What is claimed:

1. A bean roasting system, comprising:
a roasting subsystem configured to receive and to thermally roast beans;
a cooling subsystem coupled to the roasting subsystem, the cooling subsystem including:
an outer housing defining a holding chamber;
a cooling platform defining a lower bound of the holding chamber;
a vibration actuator coupled to the cooling platform; and
a platform actuator coupled to the cooling platform;
an air exit subsystem that is fluidically coupled to the cooling subsystem; and
a controller configured to:
operate the air exit subsystem to produce a flow of air through the holding chamber;
operate the roasting subsystem to transfer a batch of beans from the roasting subsystem to the holding chamber;
operate the vibration actuator to vibrate the cooling platform, operating the air exit subsystem and operating the vibration actuator accelerates cooling of the batch of beans; and
operate the platform actuator to transport the batch of beans in a downward direction and out of the cooling subsystem.

2. The bean roasting system of claim 1, wherein:
the cooling subsystem includes an upper subunit, a middle subunit, and a lower subunit,
the holding chamber and the cooling platform disposed in the middle subunit,
the upper subunit defines a chute to receive the batch of beans from the roasting subsystem.

3. The bean roasting system of claim 2, wherein the upper subunit defines an air conduit that is coupled to the air exit subsystem and is configured to receive the flow of air from the holding chamber.

4. The bean roasting system of claim 3, wherein the air exit subsystem includes an exit fan that is coupled to the air conduit and is configured to maintain the flow of air.

5. The bean roasting system of claim 1, further comprising a plurality of resilient supports that couple the cooling platform to the outer housing.

6. The bean roasting system of claim 5, wherein the vibration actuator is coupled between the outer housing and the cooling platform and is configured to impart relative vibratory motion between the cooling platform and the outer housing that flexes the resilient supports in response to the relative vibratory motion.

7. The bean roasting system of claim 6, wherein the relative vibratory motion is primarily lateral motion that is generally parallel to an upper surface of the cooling platform.

8. The bean roasting system of claim 1, wherein the cooling platform includes a plurality of rotatable leaves, the platform actuator is configured to rotate the plurality of rotatable leaves to transport the batch of beans.

9. The bean roasting system of claim 1, wherein:
the cooling platform is generally rectangular with four peripheral sides and includes a plurality of leaves, each leaf from the plurality of leaves individually has an axis of rotation about one of the four peripheral sides, the plurality of leaves meet along at least one line,
the platform actuator includes a plurality of actuators, each actuator from the plurality of actuators individually configured to rotate one leaf from the plurality of leaves about the axis of rotation to open the cooling platform along the at least one line to allow the batch of beans to fall out of the holding chamber.

10. The bean roasting system of claim 1, wherein:
the cooling platform is generally square with four peripheral sides and includes four leaves that each individually has an axis of rotation about one of the four peripheral sides and that collectively have edges that meet along two crossed lines,
the platform actuator includes an actuator for each leaf from the four leaves, the platform actuator configured to cause all of the four leaves to tilt down and away from the crossed lines to allow the batch of beans to fall out of the holding chamber.

11. The bean roasting system of claim 1, wherein the cooling subsystem includes a lower subunit below the cooling platform, the lower subunit is generally converging in the downward direction to facilitate dispensing the batch of beans into a container or bag.

12. The bean roasting system of claim 11, wherein the platform actuator is coupled between the lower subunit and a portion of the cooling platform.

13. A bean roasting system, comprising:
a roasting subsystem configured to receive and to thermally roast beans;
a cooling subsystem coupled to the roasting subsystem, the cooling platform having a plurality of peripheral sides and a plurality of leaves, each leaf from the plurality of leaves individually has an axis of rotation about one of the plurality of peripheral sides, the plurality of leaves meet along at least one line, the cooling subsystem including:
an outer housing defining a holding chamber;
a cooling platform defining a lower bound of the holding chamber;
a vibration actuator coupled to the cooling platform; and
a plurality of actuators, each actuator from the plurality of actuators individually configured to rotate one leaf from the plurality of leaves about the axis of rotation to open the cooling platform along the at least one line to allow a batch of beans to fall out of the holding chamber;
an air exit subsystem that is fluidically coupled to the cooling subsystem; and
a controller configured to:
operate the air exit subsystem to produce a flow of air through the holding chamber;
operate the roasting subsystem to transfer the batch of beans from the roasting subsystem to the holding chamber;
operate the vibration actuator to vibrate the cooling platform, operating the air exit subsystem and operating the vibration actuator accelerates cooling of the batch of beans; and
operate the plurality of actuators to transport the batch of beans in a downward direction and out of the cooling subsystem.

14. The bean roasting system of claim 13, wherein:
the cooling platform is generally rectangular, the plurality of peripheral sides has four peripheral sides.

15. The bean roasting system of claim 13, wherein:
the cooling platform is generally square, the plurality of peripheral sides has four peripheral sides.

16. The bean roasting system of claim 13, wherein:
the cooling subsystem includes an upper subunit, a middle subunit, and a lower subunit,
the holding chamber and the cooling platform disposed in the middle subunit,
the upper subunit defines a chute to receive the batch of beans from the roasting subsystem.

17. The bean roasting system of claim 16, wherein:
the upper subunit defines an air conduit that is coupled to the air exit subsystem and is configured to receive the flow of air from the holding chamber, and
the air exit subsystem includes an exit fan that is coupled to the air conduit and is configured to maintain the flow of air.

18. The bean roasting system of claim 13, further comprising:
a plurality of resilient supports that couple the cooling platform to the outer housing,
the vibration actuator is coupled between the outer housing and the cooling platform and is configured to impart relative vibratory motion between the cooling platform and the outer housing that flexes the resilient supports in response to the relative vibratory motion,
the relative vibratory motion is primarily lateral motion that is generally parallel to an upper surface of the cooling platform.

19. The bean roasting system of claim 13, wherein the cooling platform includes a plurality of rotatable leaves, the platform actuator is configured to rotate the plurality of rotatable leaves to transport the batch of beans.

20. The bean roasting system of claim 13, wherein:
the cooling subsystem includes a lower subunit below the cooling platform,
the lower subunit is generally converging in the downward direction to facilitate dispensing the batch of beans into a container or bag,
the platform actuator is coupled between the lower subunit and a portion of the cooling platform.

* * * * *